United States Patent
Zurek et al.

(10) Patent No.: US 7,773,943 B2
(45) Date of Patent: Aug. 10, 2010

(54) HEARING AID COMPATIBILITY MODE SWITCHING FOR A MOBILE STATION

(75) Inventors: Robert A. Zurek, Antioch, IL (US);
Scott K. Isabelle, Waukegan, IL (US);
Scott D. Kelley, Lake Villa, IL (US);
Alfred B. Wieczorek, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 1274 days.

(21) Appl. No.: 11/267,676

(22) Filed: Nov. 4, 2005

(65) Prior Publication Data

US 2007/0116308 A1     May 24, 2007

(51) Int. Cl.
*H04B 5/00* (2006.01)
(52) U.S. Cl. .................. 455/41.1; 455/41.2; 455/550.1; 455/41.3; 455/63.1; 381/315; 381/316; 381/317; 381/312
(58) Field of Classification Search ............. 455/550.1, 455/41.1, 41.2, 41.3, 63.1; 381/315, 316, 381/317, 312
See application file for complete search history.

(56) References Cited

U.S. PATENT DOCUMENTS

| | | | |
|---|---|---|---|
| 5,819,162 A | 10/1998 | Spann et al. | |
| 6,009,311 A * | 12/1999 | Killion et al. | 455/63.1 |
| 6,122,500 A | 9/2000 | Dent et al. | |
| 6,587,568 B1 * | 7/2003 | Sigwanz | 381/317 |
| 6,639,564 B2 | 10/2003 | Johnson | |
| 7,397,926 B1 * | 7/2008 | Frerking | 381/315 |
| 2001/0055386 A1 | 12/2001 | Waldron et al. | |
| 2003/0045283 A1 * | 3/2003 | Hagedoorn | 455/426 |
| 2006/0025172 A1 | 2/2006 | Hawker et al. | |
| 2007/0036373 A1 * | 2/2007 | Townsend et al. | 381/312 |
| 2007/0255435 A1 * | 11/2007 | Cohen et al. | 700/94 |

* cited by examiner

*Primary Examiner*—Sanh D Phu
(74) *Attorney, Agent, or Firm*—Cuenot, Forsythe & Kim

(57) ABSTRACT

A mobile station (100) that includes a processor (212) that selectively disables at least one station component to reduce electromagnetic noise generated by the station in the frequency range below 20 kHz when the mobile station is operated in the hearing aid compatible mode. The component can be, for example, a display (204), a light (206) or a wireless interface (208). The processor also can optimize characteristics of audio signals transmitted from the mobile station to the hearing aid for reproduction by the hearing aid. For instance, the processor can selectively adjust filter parameters (216) and/or a signal gain (218) applied to audio signals. A user interface (220) having a soft-key can be provided to cycle through various HAC options.

18 Claims, 3 Drawing Sheets

HEARING AID COMPATIBILITY MODE SWITCHING FOR A MOBILE STATION

BACKGROUND OF THE INVENTION

1. Field of the Invention

The present invention generally relates to wireless communications and, more particularly, to wireless communication devices that are hearing aid compatible.

2. Background of the Invention

Mobile stations, such as mobile telephones, cordless telephones, personal digital assistants (PDAs) and other wireless communication devices, transmit and receive RF signals from their antennas to support wireless communications. Typically, such RF signals are transmitted in the upper MHz and lower GHz frequency spectrums. In addition, such devices also produce electromagnetic noise, which is caused by operation of components within the station, such as backlighting, color displays, etc. The electromagnetic noise generally includes noise components both in the RF frequency range and at frequencies in the lower kHz and Hz frequency ranges (e.g. 100 Hz).

While the hearing aid industry has made progress in hardening the hearing aids against RF noise, audio transducers within the hearing aids are still susceptible to noise in the form of low frequency magnetic fields. Inasmuch as the audio transducers typically include telecoil couplers that receive signals via an induction field generated by an induction coupler, the low frequency magnetic field noise sometimes exists in the same frequency band as the generated induction field. This noise couples to the telecoil couplers, thereby degrading their signal quality.

SUMMARY OF THE INVENTION

The present invention relates to a mobile station that includes a processor that selectively disables at least one station component to reduce electromagnetic noise generated by the station in the frequency range below 20 kHz when the mobile station is operated in the hearing aid compatible mode. The component can be, for example, a display, a light or a wireless interface. The processor also can optimize characteristics of audio signals transmitted from the mobile station to the hearing aid for reproduction by the hearing aid. For instance, the processor can selectively adjust filter parameters and/or a signal gain applied to the audio signals.

The station further can include a hearing aid adapter that communicatively links the mobile station to the hearing aid. For example, the hearing aid adapter can include an induction coupler that inductively couples an audio signal from the mobile station to the hearing aid, or a transmitter that transmits an audio signal from the mobile station to the hearing aid via a modulated electromagnetic signal. The hearing aid adapter can establish a wireless communication link in response to a user selection in the user interface of a wireless coupling mode, or establish an acoustic communication link in response to a user selection in the user interface of an acoustic coupling mode.

The mobile station also can include a user interface configured to receive at least one user input to enter the mobile station into a normal mode, a wireless coupling mode or an acoustic coupling mode. For instance, the user interface can include a soft-key that, responsive to receiving a plurality of user inputs after a call has been established, causes the mobile station to cycle through a plurality of hearing aid communication modes.

The present invention also relates to a method for facilitating interoperability between a mobile station and a hearing aid. The method can include selectively disabling at least one station component to reduce electromagnetic noise generated by the station in the frequency range below 20 kHz. Selectively disabling the station component can include disabling a display, a light or a wireless interface.

In addition, the method can include optimizing characteristics of audio signals transmitted from the mobile station to the hearing aid for reproduction by the hearing aid. For instance, filter parameters and/or signal gain applied to the audio signals can be selectively adjusted.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system that facilitates interoperability between mobile stations and hearing aids in compliance with the ANSI C63.19 compatibility standard, without requiring changes to existing mobile station hardware. In particular, when a call is established and the mobile station enters a hearing aid compatible (HAC) mode, the invention selectively disables devices within a mobile station that generate electromagnetic noise which interferes with hearing aid operation. In addition, the invention can selectively change filtering and gain parameters within the station to enhance audio signal sound quality and improve the security of communications between mobile stations and hearing aids.

Figure 1:
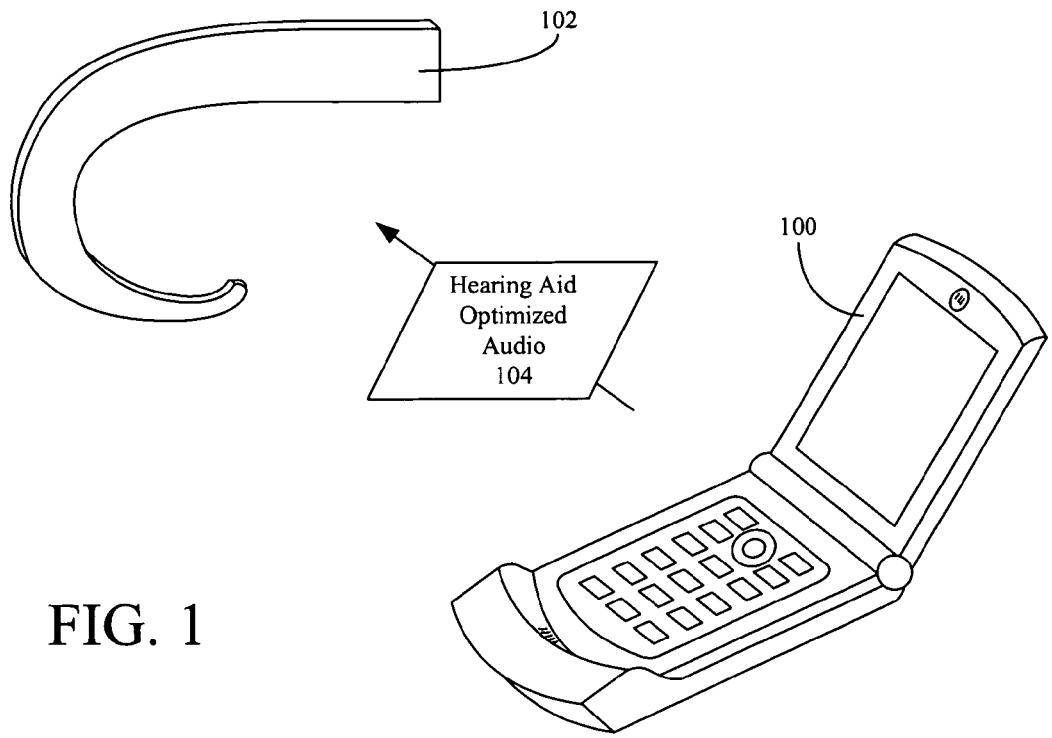
FIG. 1 depicts a mobile station and a hearing aid that are useful for understanding the present invention.

FIG. 1 depicts a mobile station 100 (hereinafter "station") and a hearing aid 102 that are useful for understanding the present invention. The hearing aid 102 can be any type of hearing aid that can be communicatively linked to the station 100 to receive audio signals. Similarly, the station 100 can be any type of mobile communication device that can be communicatively linked to the hearing aid. For example, the station 100 can be a mobile telephone, a personal digital assistant (PDA) or a mobile computer.

In one arrangement the hearing aid 102 can be communicatively linked to the station 100 via inductive coupling. For instance, the hearing aid can include a transducer (not shown), such as a telecoil coupler, that can magnetically couple to an induction coupler of the station 100. In particular, the induction coupler can generate time-varying magnetic fields that communicate hearing aid optimized audio signals 104 that are detectable by the transducer. The hearing aid 102 can convert the audio signals 104 into audible acoustic signals that can be exclusively heard by a person wearing the hearing aid 102. In comparison to using a standard output audio transducer in the station 100 to transmit the audio signals 104 acoustically from the station 100 to the hearing aid 102, use of the induction coupler to communicate the audio signals 104 provides enhanced security by reducing the risk of someone being able to eavesdrop on a conversation. It is also well known in the art to use a dynamic receiver as the induction source in the station. Such use of a dynamic receiver would improve the signal to noise ratio of the hearing aid in a manner similar to that of a stand alone induction source. Dynamic receivers do not provide security against eavesdropping, however.

In another arrangement the hearing aid 102 can be communicatively linked to the station 100 via a modulated electromagnetic signal, such as an RF signal or an optical signal. For example, the hearing aid 102 can include a receiver or transceiver (not shown) that receives modulated electromagnetic signals from the station 100. The modulated electromagnetic can communicate the hearing aid optimized audio signals 104. One example of a signaling protocol that can be used is the Bluetooth protocol which, advantageously, can be used to provide a secure wireless communication link between the station 100 and the hearing aid 102. Nonetheless, the invention is not limited in this regard and any other suitable protocol can be used.

Figure 2:
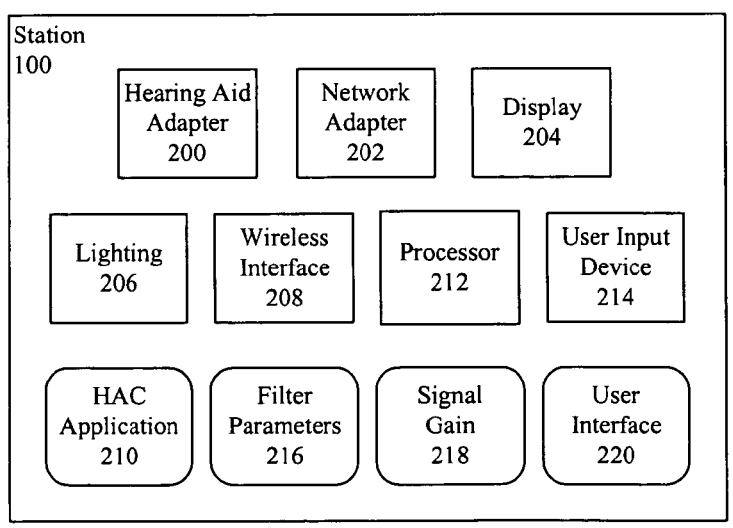
FIG. 2 depicts a block diagram of the mobile station that is useful for understanding the present invention.

FIG. 2 is a block diagram of the station 100. The station 100 can include a hearing aid adapter 200 suitable for communicatively linking the station 100 to the hearing aid. For instance, the hearing aid adapter 200 can comprise an induction coupler, a modulated electromagnetic signal transmitter, a modulated electromagnetic signal transceiver and/or a wired audio link.

The station 100 also can include a network adapter 202 that communicatively links the station 100 to a communications network. The network adapter 202 can support IEEE 802 wireless communications, WPA, WPA2, GSM, TDMA, CDMA, WCDMA, Bluetooth, direct wireless communication, TCP/IP, or any other communications protocol compatible with the communications network to which the station 100 is linked.

The station also can include a plurality of station components, for example a display 204, lighting devices 206, an additional wireless interface 208, such as a Bluetooth interface, etc. The station also can include a processor 212. The processor 212 can include a central processing unit (CPU), a digital signal processor (DSP), an application specific integrated circuit (ASIC), a programmable logic device (PLD), a plurality of discrete components that cooperate to process data, and/or any other suitable processing device.

The station also can include a HAC application 210. In one arrangement, the HAC application 210 can be selectively enabled. For example, the HAC application 210 can be enabled when a user selectable flag has been set to a specific value. In another arrangement, the HAC application 210 can be enabled by default. User selectable options also can be provided to disable the HAC application 210, although the invention is not limited in this regard.

If enabled, the HAC application 210 can be processed by the processor 212 when the communication link between the station 100 and the hearing aid is established, in response to a call being established on the station 100, or in response to a user input being received via a user input device 214. The user input can be, for example, a tactile input or a spoken utterance, and the user input device 214 can be any device suitable for receiving such user inputs. For instance, the user input device 214 can comprise a button, a key, a soft-key, a touchpad and/or a microphone. Implementation of such devices is known to the skilled artisan.

The HAC application 210 can selectively disable the station components when the station is communicatively linked to the hearing aid. For instance, the HAC application 210 can disable the display 204, the lighting devices 206, the additional wireless interface 208, or any other station components that generate electromagnetic noise which may interfere with operation of the hearing aid, especially noise in the frequency range below 20 kHz. Accordingly, the electromagnetic interference affecting the hearing aid can be minimized to insure a high quality communication experience for a person using the hearing aid.

In addition to disabling selected station devices, the HAC application 210 also can optimize filter parameters 216 and/or signal gain 218 applied to the audio signal that is transmitted to the hearing aid to further improve the quality of the communication experience. For example, if the hearing aid utilizes a telecoil coupler to receive audio signals from the station 100, the HAC application 210 can adjust the gain 218 and/or the filter parameters 216 to optimize the audio signals for the telecoil coupler. If the hearing aid utilizes an acoustic receiver, the HAC application 210 can adjust the gain 218 and/or the filter parameters 216 to optimize the audio signals for the acoustic receiver. If, however, it is determined that the default signal processing settings are adequate for a particular mode, such as audio coupling mode, such settings can be used without adjusting the gain 218 or filter parameters 216.

The station 100 also can include a user interface 220 that presents user selectable HAC application options to the user. The user interface 220 can be activated by a user input, for example a user selection of a menu option, automatically activated when a hearing aid is detected by the station 100, or automatically activated when a call is established on the station 100. The user interface 220 can provide selectable options to continue in a non-HAC mode or to switch to an HAC mode. If the user selects the HAC mode, a sub-menu of further selectable HAC options also can be presented. For instance, the user can be presented options to connect to the hearing aid via an induction coupler, Bluetooth, or another modulated signal connection.

In one arrangement, a single menu selection or soft-key can be provided to cycle through various HAC options. For instance, the menu selection or soft-key can be automatically presented as a user selectable option. Presentation of the menu selection or soft-key can be limited to those stations in which the HAC mode has been activated, either by default, by a user setting, or by detection of a hearing aid available to be communicatively linked to the station. In another arrangement, presentation of the menu selection or soft-key can be limited to those stations on which a hearing aid has been detected.

Figure 3:
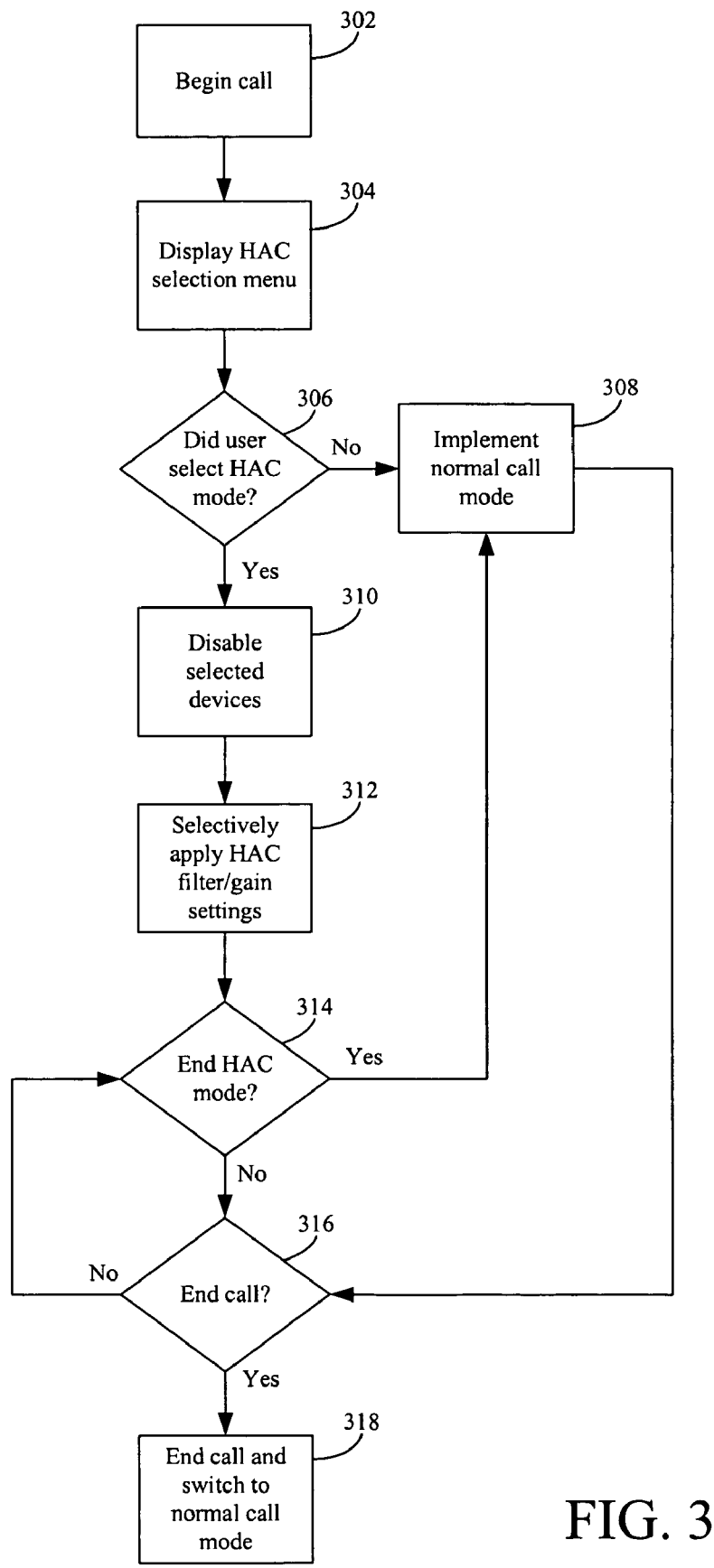
FIG. 3 is flowchart that is useful for understanding the present invention.

FIG. 3 is flowchart that presents a method 300 which is useful for understanding the present invention. The method 300 can begin in a state in which HAC mode has been activated on the station. Beginning at step 302, a call can be established. At step 304, an HAC selection menu can be presented to the user in the user interface. Proceeding to decision box 306, if the user selects not to implement HAC mode, normal call mode can be implemented, as shown in step 308.

If, however, the user does select HAC mode, the process can proceed to step 310 where selected station devices are disabled. For instance, the devices which are disabled can be devices that generate electromagnetic noise when in operation, but which are not necessary to sustain the call while the hearing aid is in use. Continuing to step 312, filter parameters and gain settings can be selectively applied to call processing functions to optimize audio performance of the station with the hearing aid. For example, if the station is communicatively linked to a hearing aid having a telecoil coupler, the filter and gain parameters that are applied can be selected to optimize communications between the station and the telecoil coupler. However, if the station is in audio coupling mode and the default signal processing settings are optimal, the default settings can be applied.

Referring to decision box 314, if the user chooses to end the HAC mode, for instance the user selects an end HAC mode menu item via the user interface, the station can implement normal call mode, as shown in step 308. Referring to decision box 316, if the user does not make such a selection, the call can be maintained in HAC mode until the call is ended.

Once the call has ended, the station can switch back to normal call mode, as shown in step 318. The process of switching back to normal mode can include enabling devices that were disabled during the call. In addition, the filter and gain parameters can be reset to default values or previously selected values, and the hearing aid adapter can be disabled.

Figure 4:
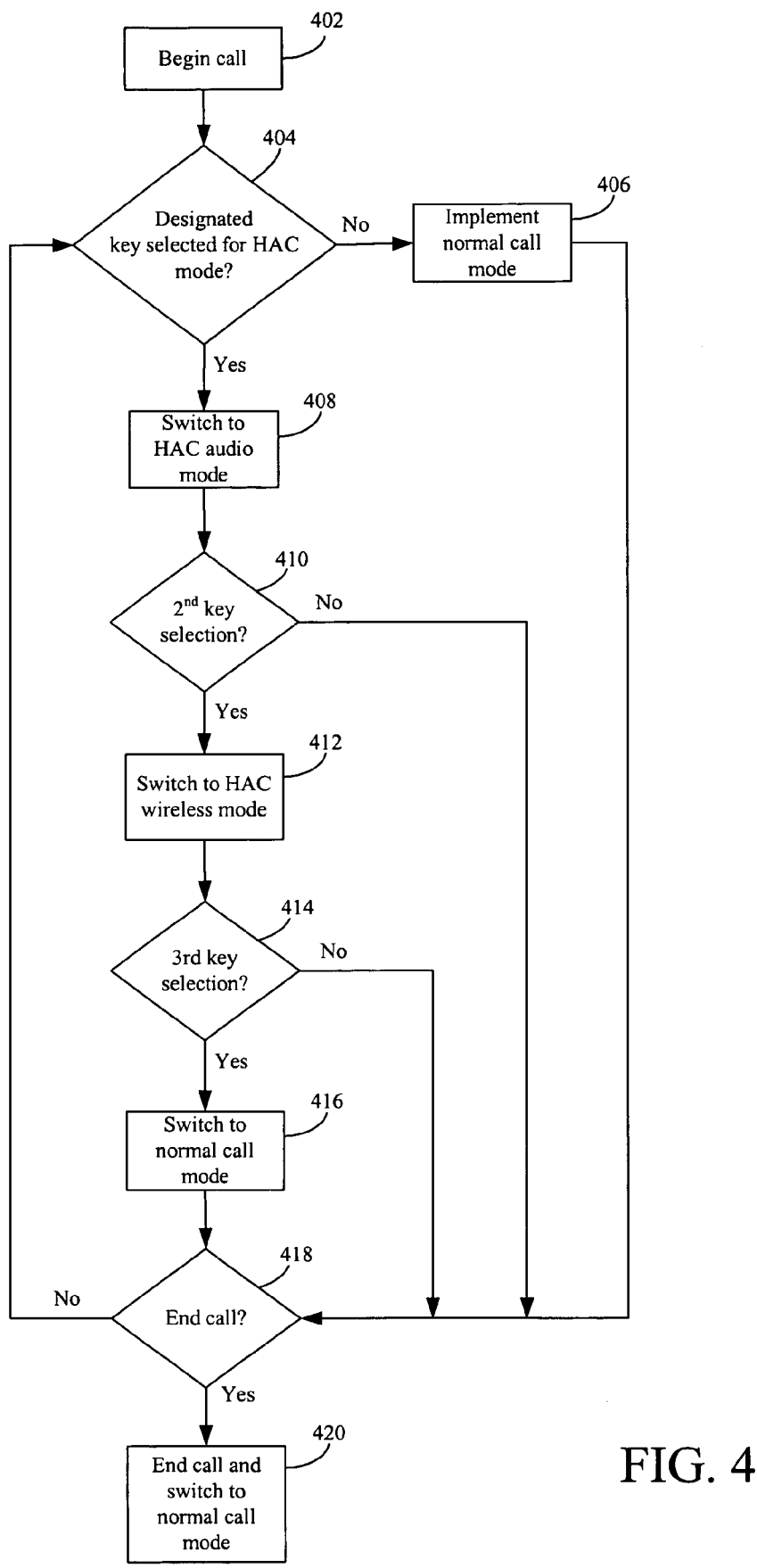
FIG. 4 is another flowchart that is useful for understanding the present invention.

FIG. 4 is another flowchart that presents a method 400 that is useful for understanding the present invention. The method 400 presents a method in which a single menu selection or a soft-key can be used to select a desired HAC mode. Again, the method 400 can begin in a state in which HAC mode has been activated on the station.

Beginning at step 402, a call can be established. Referring to decision box 404, if a designated key that switches the station to HAC mode is not selected, the call can be implemented in normal call mode, as shown in step 406. If, however, the designated key is selected, the station can enter HAC audio mode, as shown in step 408. Referring to decision box 410, if the key is not selected a second time, the station can remain in HAC audio mode. However, if the key is selected a second time, the station can switch to HAC wireless mode, as shown in step 412. Continuing to decision box 414, the station can remain in the HAC wireless mode if the key is not selected a third time. However, if the key is selected a third time the station can switch to normal call mode, as shown in step 416.

Referring to decision boxes 418 and 404, the key can be selected at any time to change call modes. For instance, if the key has been depressed a certain number of times, the key can be depressed one or more additional times to change the HAC mode of the station. If, however, the key is not further depressed, the station can remain in the last selected operation mode until the call ends. The Station then can switch back to normal mode, as shown in step 420.

The present invention can be realized in hardware or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular functions either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A mobile station comprising:
a processor that selectively disables at least one mobile station component to reduce electromagnetic noise generated by the mobile station in the frequency range below 20 kHz when the mobile station is operated in a hearing aid compatible mode;
wherein the processor further optimizes characteristics of audio signals transmitted from the mobile station to a hearing aid for reproduction by the hearing aid.

2. The mobile station of claim 1, wherein the at least one component is selected from the group consisting of a display, a light and a wireless interface.

3. The mobile station of claim 1, wherein the processor selectively adjusts at least one parameter applied to the audio signals selected from the group consisting of a filter parameter and a signal gain.

4. The mobile station of claim 1, further comprising a hearing aid adapter that communicatively links the mobile station to a hearing aid via a wireless communication link or an acoustic communication link.

5. The mobile station of claim 4, wherein the hearing aid adapter comprises an induction coupler that inductively couples an audio signal from the mobile station to the hearing aid.

6. The mobile station of claim 4, wherein the hearing aid adapter comprises a transmitter that transmits an audio signal from the mobile station to the hearing aid via a modulated electromagnetic signal.

7. The mobile station of claim 1, further comprising a user interface configured to receive at least one user input to enter the mobile station into a normal mode, a wireless coupling mode or an acoustic coupling mode.

8. The mobile station of claim 1, wherein the mobile station further comprises a user interface comprising a soft-key that, responsive to receiving a plurality of user inputs after a call has been established, causes the mobile station to cycle through a plurality of hearing aid communication modes.

9. A machine readable storage, having stored thereon a computer program having a plurality of code sections executable by a machine for causing the machine to perform the step of selectively disabling at least one mobile station component to reduce electromagnetic noise generated by the station in the frequency range below 20 kHz when the mobile station is operated in a hearing aid compatible mode;
wherein the step of selectively disabling the station component comprises disabling at least one component selected from the group consisting of a display, a light and a wireless interface.

10. The machine readable storage of claim 9, further causing the machine to optimize characteristics of audio signals transmitted from the mobile station to a hearing aid for reproduction by the hearing aid.

11. The machine readable storage of claim 10, wherein the step of optimizing the signal characteristics comprises selectively adjusting at least one parameter applied to the audio signals selected from the group consisting of filter parameters and a signal gain.

12. The machine readable storage of claim 9, further causing the machine to inductively couple an audio signal from the mobile station to a hearing aid.

13. The machine readable storage of claim 9, further causing the machine to transmit an audio signal from the mobile station to a hearing aid via a modulated electromagnetic signal.

14. The machine readable storage of claim 9, further causing the machine to enter into a normal mode, a wireless coupling mode or an acoustic coupling mode in response to receiving at least one user input via a user interface.

15. The machine readable storage of claim 9, further causing the machine to cycle through a plurality of hearing aid communication modes in response to receiving a plurality of user inputs via a soft-key of a user interface, the user inputs being received after a call has been established.

16. A method for facilitating interoperability between a mobile station and a hearing aid, comprising selectively disabling at least one station component to reduce electromagnetic noise generated by the station in the frequency range below 20 kHz when the mobile station is operated in a hearing aid compatible mode;
wherein selectively disabling the mobile station component comprises disabling at least one component selected from the group consisting of a display, a light and a wireless interface.

17. The method according to claim 16, further comprising optimizing characteristics of audio signals transmitted from the mobile station to a hearing aid for reproduction by the hearing aid.

18. A mobile station comprising:
a processor that selectively disables at least one mobile station component to reduce electromagnetic noise generated by the mobile station in the frequency range below 20 kHz when the mobile station is operated in a hearing aid compatible mode;
wherein the at least one component is selected from the group consisting of a display, a light and a wireless interface.

* * * * *